United States Patent
Burkhalter, Jr.

[15] 3,635,502
[45] Jan. 18, 1972

[54] QUICK PIPE CONNECTOR

[72] Inventor: Robert Burkhalter, Jr., Fort Atkinson, Wis.

[73] Assignee: Morton-Norwich Products, Inc., Chicago, Ill.

[22] Filed: Nov. 24, 1969

[21] Appl. No.: 879,377

[52] U.S. Cl.............................285/177, 285/322, 285/348, 285/354
[51] Int. Cl..........................................F16l 55/00
[58] Field of Search..................285/177, 322, 323, 324, 340, 285/348, 354

[56] References Cited

UNITED STATES PATENTS 2,958,548  11/1960  Vienne et al.......................285/177 X

FOREIGN PATENTS OR APPLICATIONS 673,408  11/1963  Canada.................................285/340
244,253  12/1925  Great Britain........................285/177
379,413  9/1932  Great Britain........................285/323
916,070  1/1963  Great Britain........................285/340

Primary Examiner—Jacob Shapiro
Assistant Examiner—David H. Corbin
Attorney—Pendleton, Neuman, Williams & Anderson

[57] ABSTRACT

This disclosure relates to a pipe and tubing connector adapted to quickly and easily connect unthreaded pipe to a hollow body with a fluidtight seal, in which a variety of different pipe and tubing sizes may be accommodated. The pipe or tubing is tightly clamped to resist withdrawal from the connector, and electrical continuity is supplied between the pipe or tubing and the conduit.

4 Claims, 4 Drawing Figures

PATENTED JAN 18 1972 3,635,502
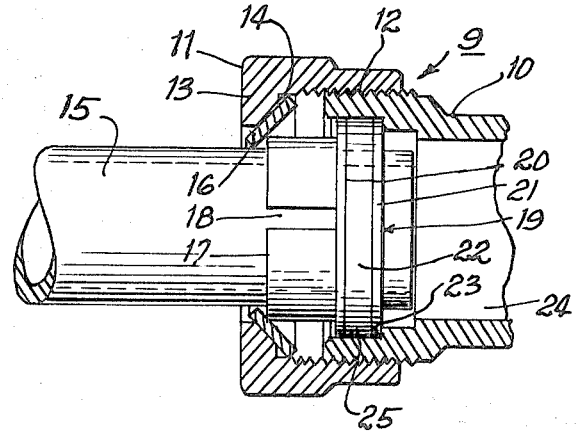
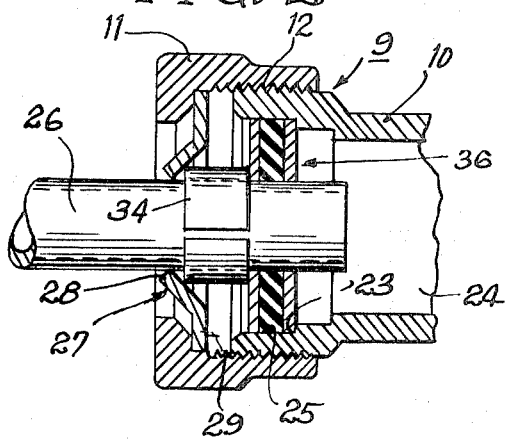
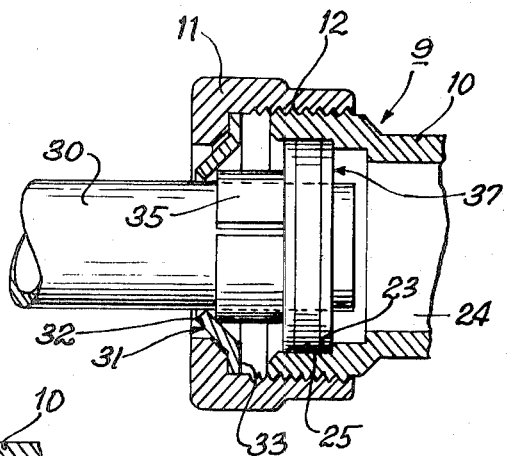
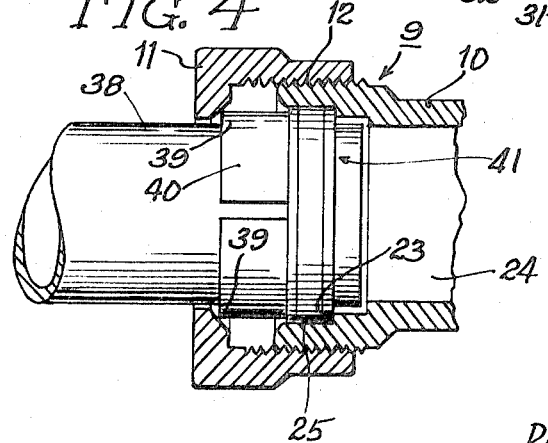
INVENTORS
Robert Burkhalter, Jr.
By Pendleton, Neuman, Seibold
and Williams, Attys

QUICK PIPE CONNECTOR

BACKGROUND OF THE INVENTION

In many situations it is desirable to quickly and easily connect a fluid-carrying pipe or length of tubing to a separate conduit formed as a part of, or connected to, a utilization device or the like. The conventional manner of connecting pipe requires that the pipe be threaded, which requires special equipment. Threading also requires the expenditure of a great deal of time, and the exercise of considerable skill. It is, therefore, desirable that the need for threading be avoided. It is also desirable that the conduit be connected to various sizes of pipe, without the use of multiple threaded adapters, so that a connection may quickly be made to a range of different size pipes.

It is also important to furnish electrical continuity between the supply pipe and the conduit by means of metal-to-metal contact between the pipe and the conduit.

SUMMARY OF THE INVENTION

It is, therefore, a principal object of the present invention to provide a quick pipe connector adapted to furnish a fluidtight seal between a conduit and a variety of different sizes of pipe.

It is another object of the present invention to provide such a connector which furnishes electrical continuity between the pipe and the conduit.

A further object of the present invention is to provide such a connector which does not require that the pipe be previously threaded.

These and other objects of the present invention will become manifest upon an examination of the description and the accompanying drawings.

In one embodiment of the present invention there is provided a connector having a hollow body, and a cap member threadably secured in coaxial relation with the body, the cap member having a coaxial aperture to receive a pipe projecting therethrough into said body and a shoulder interior of said aperture, a conical washer surrounding the pipe and bearing against the shoulder of said cap member, a grip washer surrounding said pipe inwardly of said conical washer, and a backup washer surrounding said pipe inwardly of said grip washer, said body having a conduit communicating with the end of the pipe and having a shoulder surrounding an end of said conduit for bearing against said backup washer.

DESCRIPTION

Reference will now be made to the accompanying drawings in which:

FIG. 1 is a vertical cross-sectional view of an illustrative embodiment of the present invention associated with a pipe of relatively large diameter;

FIG. 2 is a vertical cross-sectional view of the apparatus of FIG. 1 associated with a pipe of relatively small diameter;

FIG. 3 is a vertical cross-sectional view of the apparatus of FIGS. 1 and 2 associated with a pipe of intermediate cross section; and FIG. 4 is a vertical cross-sectional view of apparatus embodying the present invention associated with the maximum pipe size which it can accommodate.

Referring now to FIG. 1, a connector 9 embodying the present invention employs a body 10 and a cap member 11, threadably connected to the body 10 by means of threads 12. The cap member 11 extends outwardly from the end of the body 10 and terminates in an inwardly projecting flange 13 having a shoulder 14 on its interior side and a central aperture receiving a pipe 15. Inwardly of the flange 13 is disposed a conical washer 16, having the form of a hollow truncated cone, with a central aperture to receive the pipe 15.

A grip washer 17 surrounds the pipe 15, inwardly of the conical washer 16, and is formed of a ring-shaped strip of metal. The ends of the strip forming the grip washer 17 do not meet, but are spaced apart by a gap 18. Inwardly of the grip washer 17 is a backup washer 19, having a pair of rigid washers 20 and 21 spaced apart by a washer 22 formed of resilient material such as rubber or the like. The grip washer 17 and the backup washer 19 both have central apertures to receive the pipe 15.

The interior end of the grip washer 17 bears on the exterior surface of the washer 20, and pushes it inwardly toward the body 10. This in turn compresses the washer 22 and forces it against the washer 21. The washer 21 is restrained from inward motion by means of a shoulder 23, formed by a counterbore coaxial with the internal conduit 24 of the body 10.

In operation, the cap member 11 is first placed on the pipe 15, followed by the conical washer 16, the grip washer 17, and the backup washer 19. The end of the pipe 15 is then placed within the body 10, so that the backup washer 19 abuts the shoulder 23. The cap member 11 is then threaded onto the body 10 until tight. During tightening, the conical washer 16 urges the grip washer 17 rightwardly and also radially inwardly against the pipe 15. This compresses the grip washer 17 and also compresses the resilient washer 22. The resilient washer 22 is urged outwardly into contact with the interior surface 25 of the body 10, and is also urged inwardly against the pipe 15. The resilient washer 22 thus furnishes a fluidtight seal between the pipe 15 and the body 10. In addition, the radially inward urging of the grip washer 17 grips the pipe 15 tightly to prevent it from being extracted from the connector. Electrical continuity is furnished from the pipe 15 and the grip washer 17 through the conical washer 16, the cap member 11 and the body 10.

The same connector may be employed with a variety of different sizes of conical washers to cooperate with a variety of pipe sizes. In FIG. 2, where a small size pipe 26 is illustrated in cooperation with the connector 9, a larger conical washer 27 is employed. The washer 27 has a central section 28 formed as a hollow truncated cone with a central aperture, and an outer plane flange 29. FIG. 3 shows an intermediate size pipe 30 connected to the connector with an intermediate size conical washer 31, formed with a hollow truncated conical center section 32, and an outer plane flange 33 smaller than the flange 29 used for the smaller pipe. FIG. 4 shows a large size pipe 38, connected directly to the connector without any conical washer, with the beveled surface 39 of the cap member 11 bearing directly on the grip washer 40. In each case, the grip washers 34, 35 and 40, respectively, are of the suitable diameter to surround the tightly grasp the pipe, and the apertures within the backup washers 36, 37 and 41, respectively, are also of a size appropriate to the pipe. The same body 10 and cap member 11 are employed for all four sizes.

The body 10 may be connected to or part of a utilization device, such as a faucet or a dishwasher; or a conduit such as a hose or the like. The body 10 can be connected to any of a variety of sizes of unthreaded pipe simply by selecting the correct size conical washer, grip washer, and backup washer. The electrical continuity achieved inherently in the connector allows its employment with water pipe used as an electrical ground connection, and makes it suitable also for use with electrical conduit, especially where such conduit is used to contain a fluid (e.g. such as gas under pressure) or to keep fluid (e.g. such as water) from entering the conduit. The connector of the present invention can also advantageously be used with flexible tubing such as copper tubing. The sizes of the grip washer and the conical washer are chosen to cooperate with the diameter of the tubing. The rigidity of the connection furnished by the connector makes it possible to support the body 10 via the pipe connected to it, or vice versa.

What is claimed is:

1. A quick pipe connector adapted to accommodate a variety of pipe sizes comprising a hollow body, a cap member threadably secured in coaxial relation to said body, said cap member having a coaxial aperture to receive a pipe and a cap shoulder interior of said aperture, said pipe having one of a plurality of sizes and projecting through said coaxial aperture into said body, a grip washer surrounding said pipe inwardly of said cap shoulder, said grip washer comprising a ring-shaped strip formed in a circle with the ends of said strip spaced apart, and a backup washer surrounding said pipe inwardly of said grip washer, said backup washer comprising a pair of rigid washers with a resilient sealing member disposed between said rigid washers, said body surrounding said backup washer and having a conduit communicating with the end of said pipe with a body shoulder surrounding an end of said conduit, said backup washer bearing against said body shoulder, and a replaceable conical washer having an aperture matched to said pipe size surrounding said pipe between said grip washer and said cap shoulder, whereby as said cap member is advanced relative to said body, said cap shoulder presses against said conical washer to urge said grip washer into tighter relation about the pipe, and presses said backup washer against said body shoulder to compress said resilient sealing member into sealing relationship with said pipe.

2. Apparatus according to claim 1, wherein said body and said cap member cooperate to form a fluidtight connector between said body and said pipe, said conical washer, said grip washer and said backup washer all having central apertures slightly greater than the diameter of said pipe.

3. Apparatus according to claim 2, wherein said conical washer has a central hollow truncated cone shape with a central aperture to receive said pipe, said cone shape extending outwardly from said pipe to engage the edge of said grip washer with the cap shoulder.

4. Apparatus according to claim 3, including a plane flange secured to the outer periphery of said cone-shaped washer and extending outwardly therefrom to a radius greater than the radius of the aperture of said cap member.

* * * * *